(12) United States Patent
Ur-Rehman et al.

(10) Patent No.: US 11,076,610 B2
(45) Date of Patent: *Aug. 3, 2021

(54) METHOD FOR MAKING A DAIRY COMPOSITION

(75) Inventors: Shakeel Ur-Rehman, Naperville, IL (US); John M. Dunker, Colorado Springs, CO (US); Michael J. McCloskey, Demotte, IN (US)

(73) Assignee: fairlife, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/741,035

(22) PCT Filed: Nov. 2, 2008

(86) PCT No.: PCT/US2008/082176
§ 371 (c)(1),
(2), (4) Date: Aug. 8, 2010

(87) PCT Pub. No.: WO2009/059267
PCT Pub. Date: May 7, 2009

(65) Prior Publication Data
US 2010/0297294 A1    Nov. 25, 2010

Related U.S. Application Data

(63) Continuation-in-part of application No. 11/641,468, filed on Dec. 18, 2006, now abandoned, which is a continuation-in-part of application No. 10/229,462, filed on Aug. 27, 2002, now Pat. No. 7,169,428.

(60) Provisional application No. 60/985,145, filed on Nov. 2, 2007.

(51) Int. Cl.
*A23C 9/142* (2006.01)
*A23C 11/10* (2021.01)
*A23C 9/123* (2006.01)

(52) U.S. Cl.
CPC ............ *A23C 9/1422* (2013.01); *A23C 9/123* (2013.01); *A23C 11/106* (2013.01)

(58) Field of Classification Search
CPC ...... A23C 9/1422; A23C 9/123; A23C 11/106
USPC .............. 426/34, 42, 43, 580, 583, 490, 491
See application file for complete search history.

(56) References Cited

U.S. PATENT DOCUMENTS

| | | | |
|---|---|---|---|
| 4,110,476 A * | 8/1978 | Rhodes ................. | A23C 9/123 426/41 |
| 4,956,186 A * | 9/1990 | Streiff et al. .................... | 426/43 |
| 7,169,428 B2 * | 1/2007 | Dunker ................ | A23C 9/1512 426/580 |
| 7,829,130 B2 * | 11/2010 | Tossavainen et al. ........ | 426/580 |
| 2007/0166447 A1 * | 7/2007 | Ur-Rehman et al. ......... | 426/580 |

* cited by examiner

*Primary Examiner* — Leslie A Wong
(74) *Attorney, Agent, or Firm* — Winstead PC

(57) ABSTRACT

The invention relates to food products and to their methods of preparation. More particularly, the invention relates to cultured dairy products, especially cultured yogurt products and to their methods of preparation.

5 Claims, 3 Drawing Sheets

METHOD FOR MAKING A DAIRY COMPOSITION

CROSS REFERENCES TO RELATED APPLICATIONS

This application is a 371 of PCT/US08/82176, filed Nov. 2, 2008. PCT/US08/82176 has the benefit of U.S. Provisional Application 60/985,145, filed Nov. 2, 2007. PCT/US08/82176 is a continuation-in-part of application Ser. No. 11/641,468, filed Dec. 18, 2006, now abandoned. This application claims the benefit of U.S. Provisional Application 60/985,145, filed Nov. 2, 2007. This application is a continuation-in-part of application Ser. No. 11/641,468, filed Dec. 18, 2006, now abandoned, which is a continuation-in-part of application Ser. No. 10/229,462, filed Aug. 27, 2002, now U.S. Pat. No. 7,169,428.

FIELD OF THE INVENTION

The invention relates to food products and to their methods of preparation. More particularly, the invention relates to cultured dairy products, especially cultured yoghurt products and to their methods of preparation.

The invention further relates to methods for the preparation of sugar-free yogurt compositions.

BACKGROUND OF THE INVENTION

Yogurt is a nutritious popular dairy product. At retail, yogurt is now available in a wide assortment of varieties of texture, fat content, sweetener type and level, and flavor among other attributes. Other than aseptically packaged yogurt, yogurt is generally distributed and consumed with a live culture that requires refrigerated distribution at 2° C. to 10° C. (36° F. to 45° F.). Yogurt can be manufactured with a low-glycemic value, which is suitable for consumption by both lactose-intolerant persons as well as diabetics Yoghurt is an acidified coagulated milk obtained from pasteurized milk by natural souring of milk by harmless lactic acid bacterial cultures of *Lactobacillus bulgaricus* and or *Streptococcus thermophilus*.

From a yogurt manufacturing process standpoint, all yogurts generally fall into one of two styles; namely, 1) set yogurts, and 2) stirred style. Within these broad two classifications, numerous yogurt varieties exist.

In producing stirred yogurt products, a manufacturer typically 1) ferments an inoculated dairy base mix in bulk, e.g., in large stirred fermentation or culturing tanks; 2) cools the yogurt so formed to arrest the fermentation; and then 3) fills the individual yogurt container with thickened yogurt. Production facilities producing the yogurt are run in a continuous or semi-continuous manner. Furthermore, such production facilities experience a great deal of variability with respect to production run schedules as a result of lengthy and variable fermentation times that can result from standard processing procedures and formulation variability. The fermentation time of the same basic formula can vary from anywhere from ten minutes to sixty minutes. A number of factors can affect the fermentation time variability of the yogurt production process, such as starter culture selection, bacteriophage, fermentation temperatures, formulations, total solids content of the formulation, and operator error in the addition of ingredients to the formulation.

Generally, the process of producing stirred yogurt products more specifically includes; fermenting a dairy base mix comprising carbohydrate sweetening agent(s) to produce a yogurt of desired acidity and thickness, thereafter the yogurt is pumped through cooling heat exchangers to arrest the fermentation. Alternatively, the yogurt can be cooled in a two stage process to reduce shear and maximize the viscosity of the product. In a two stage process the yogurt can be first cooled to 21° C. (70° F.) via a cooling plate, thereafter the yogurt can be cooled to 4° C. (40° F.) via a cooling tunnel. Flavorings and sweeteners can be admixed with the cooled yogurt and the yogurt can be charged to containers. Care needs to be taken to minimize the shear imparted to the yogurt in practicing such process steps to minimize the loss of thickness or viscosity built up by the fermentation step. Thus, the stirred-style yogurt typically has a higher viscosity that set-style yogurts upon filling due to the lower temperature and the thickening effect of the yogurt culture. Nonetheless, the stirred style yogurt typically builds in volume and increases substantially in viscosity over time after filling until the intended finish viscosity has been reached.

Generally, yogurt manufacturing involves the addition of carbohydrate sweetening agent(s) and preservative(s) into the dairy base mix prior to fermentation.

One of the main objectives of adding carbohydrate sweetening agent(s) to a yogurt product is to tone down or minimize the acidic taste of the product. Preservative(s) are added to a yogurt product to inhibit yeast and mold growth in the product. The addition of carbohydrate sweetening agent(s) and preservative(s) in the cultured dairy product pre-fermentation has generally been necessary due to the need to heat treat or sterilize the carbohydrate sweetening agent(s) and preservative(s) to ensure no undesirable bacterial growth interaction in the finished cultured yogurt product. Additionally, carbohydrate sweetening agent(s) and preservative(s) have generally been admixed with the dairy base mix pre-fermentation, as the pre-fermentation addition minimized the complexity of the yogurt production process via admixture of most ingredients in one step.

Furthermore, in some countries regulations have not permitted the post fermentation addition of ingredients that do not contribute to the products flavor.

Commonly, fruit sauces or purees are optionally stirred into the stirred yogurt immediately prior to filling. Such stirred style yogurts comprising intermixed fruit purees are often referred to as "Swiss" style or, sometimes as "Continental" or "French" style. Occasionally, stirred Swiss style yogurts are formulated with excessive amounts of stabilizer(s) with the result that after upon refrigerated storage for 48 hours, the yogurt possesses a solid-like consistency, somewhat reminiscent of custard style yogurt. In some instances carbohydrate sweetening agent(s) and preservative(s) are added to the fruit sauces or purees prior to admixing into the stirred yogurt. However, only limited amounts of carbohydrate sweetening agent(s) can be added to the fruit sauces or purees, as the sauces or purees will become saturated and the carbohydrate sweetening agent(s) will not disperse or dissolve in the sauce or puree, resulting in a finished yogurt product having a granular texture. Additionally, fruit sauces or purees are not always added to a yogurt (e.g. plain yogurt, vanilla flavored yogurt, caramel flavored yogurt, chocolate flavored yogurt, etc.), thus addition of a carbohydrate sweetening agent(s) or preservative(s) into a fruit sauce or puree is not possible.

As can be appreciated from the above description of the numerous styles and flavors within styles of yogurts, product proliferation and differentiation is an important characteristic of commercial yogurt manufacture. As can be further appreciated the numerous styles, product proliferation and differentiation in yogurt products results in numerous manufacturing parameters and fermentation times across the field of yogurt styles. The variability in product of one style or flavor compared to another causes operational problems in manufacturing ranging from scheduling, capacity, product quality, and overuse.

Additionally, yogurt styles or bases having long fermentation times (e.g. greater than four hours) can exhibit greater variability and less predictability during the fermentation step, thus increasing production operation problems.

The above limitations and difficulties have now been overcome and the invention satisfies the above objectives.

SUMMARY OF THE INVENTION

Figure 1:
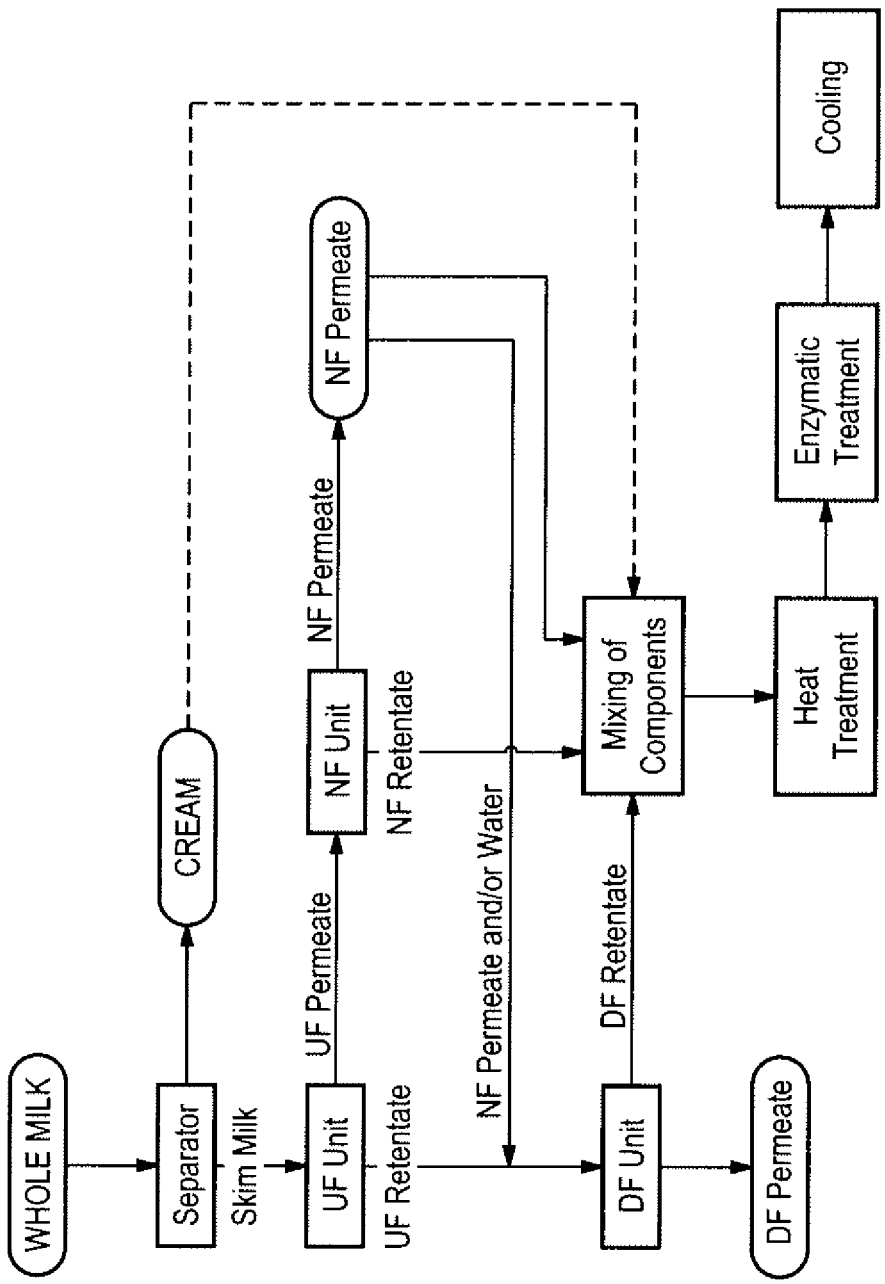
FIG. 1 illustrates a first method of separating milk components.

Embodiments of the invention provide dairy products and methods of preparing cultured dairy products such as stirred-style yogurt and set-style yogurt. Yogurt compositions of the invention are prepared by fermentation of a nanofiltration (NF) retenate fraction of milk, which is a lactose-rich fraction. The advantages of performing the fermentation process on the NF retenate fraction rather than whole milk including, the need of less culture and time required for the fermentation of NF retenate relative to whole milk, ability to separate fermentation bacteria more easily from the NF retenate fraction, and the ability to store the fermented retenate for future use as needed.

If the cultures fail, only NF retenate (2% of the recipe) is required to be disposed, which is economical for the business and less harsh on environment. The acidified NF retenate is less viscous than acidified milk, therefore, need for pumps to handle viscous products would be reduced particularly for making stirred yoghurts.

The invention finds particular suitability for use in connection with the provision of stirred style yogurts as well as set-style yogurts.

Additionally, milk may be concentrated to a desired solid content of 16-24% by weight by a reverse osmosis process followed by culturing and fermentation.

A further embodiment of the invention provides a method of adding a reverse osmosis concentrate of milk to a milk source in preparation for culturing.

Another embodiment of the invention provides a method for concentrating a set yogurt made from cow's milk to a high solids yogurt by reverse osmosis concentration.

In a further embodiment of the invention, the set yogurt may be subjected to an ultrafiltration process to increase the solids as required in certain types of yogurt such as Greek-style yogurt.

Embodiments of the invention provide methods for preparing an improved cultured dairy product having decreased fermentation times.

DESCRIPTION OF EXEMPLARY EMBODIMENTS OF THE INVENTION

The invention is directed to a process for preparing a yogurt composition having reduced production times, more specifically a yogurt having reduced fermentation times wherein the yogurt composition is prepared from a component of milk derived from a membrane fractionation process.

An embodiment of the method of the invention provides for the use a membrane-fractionated component having a high concentration of lactose (9-20% by weight). For example, a raw material such as bovine milk is subjected to a membrane fractionation process as set forth in FIGS. 1-3. The fraction that represents the nanofiltration retenate (NF-R) component, which is a lactose-rich fraction, is collected. The NF-R fraction can be subjected to fermentation, and this fermented fraction can be used in the preparation of a dairy composition such as yogurt. Some of the advantages of performing the fermentation process on the NF retenate fraction rather than whole milk include, the need of less culture and time required for the fermentation of NF retenate relative to whole milk (as a result of the high lactose content), ability to separate fermentation bacteria more easily from the NF retenate fraction than from whole milk, and the ability to store the fermented retenate for future use (as a starter culture) as needed.

In an embodiment of the invention, the NF-R fraction is subjected to fermentation using one or more strains of lactic-acid generating bacteria. The fermented NF-R fraction is combined with one or more additional components derived from the membrane fractionation process.

An embodiment of the invention provides a method wherein the fermented NF-R fraction is mixed with a diafiltration retentate fraction, cream and a reverse osmosis retentate fraction. The mixture is maintained at a pH of less than 5.0. The mixture is placed in containers and incubated at 107.6° F. (42° C.) for 4-6 hours or 66-72° F. for 20-24 hours until a firm coagulum is formed. In this process sugar-free yogurt is obtained as the lactose in the yoghurts is converted to lactic acid by yogurt bacteria. In certain embodiments of the invention, the lactose in yogurt milk before fermentation is standardized to 1.5 to 2.0%. In this process the calorie value of yogurt is also reduced which is a benefit to those who watch their daily calorie consumption.

Figure 2:
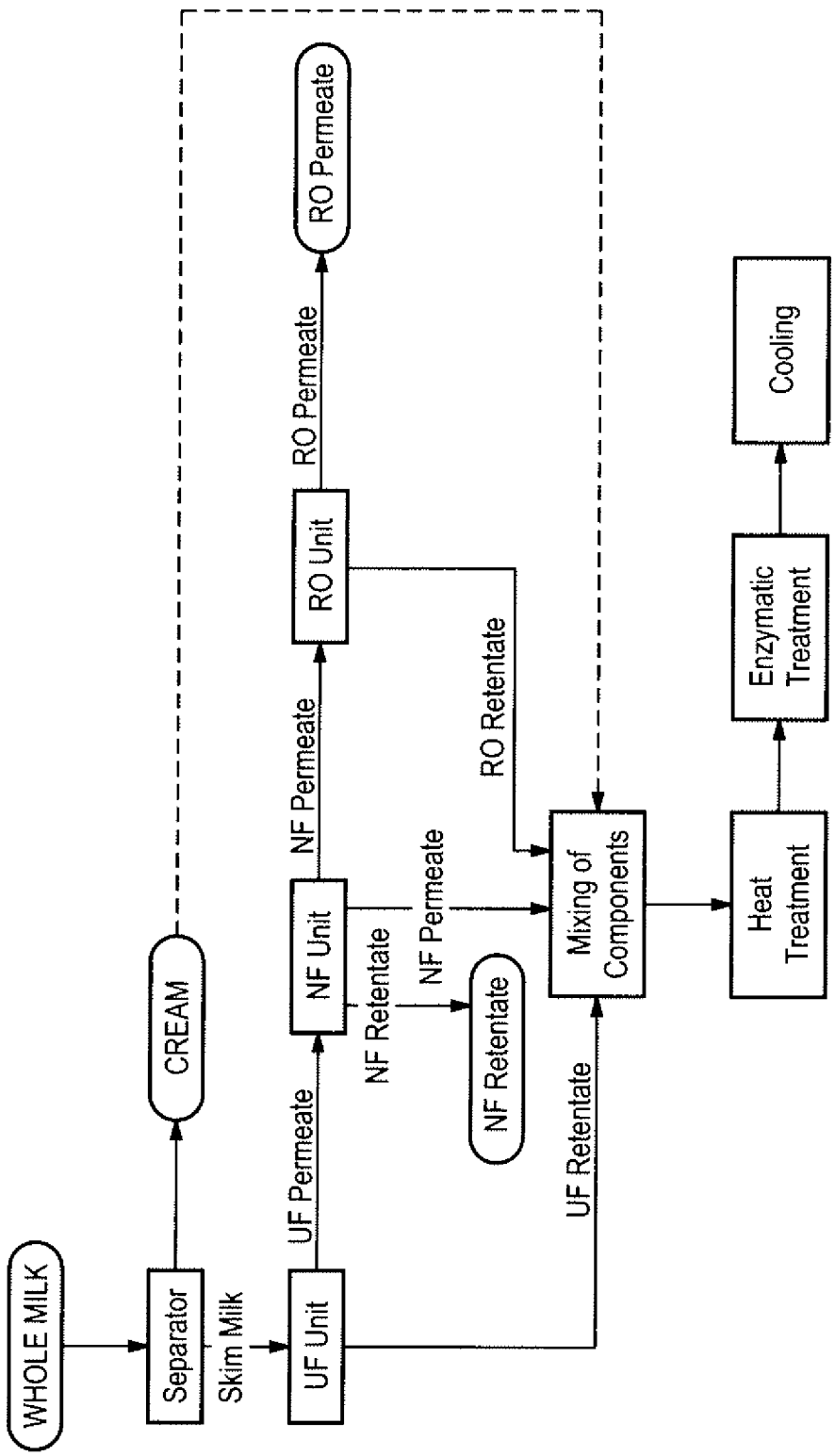
FIG. 2 illustrates a second method of separating milk components.
Figure 3:
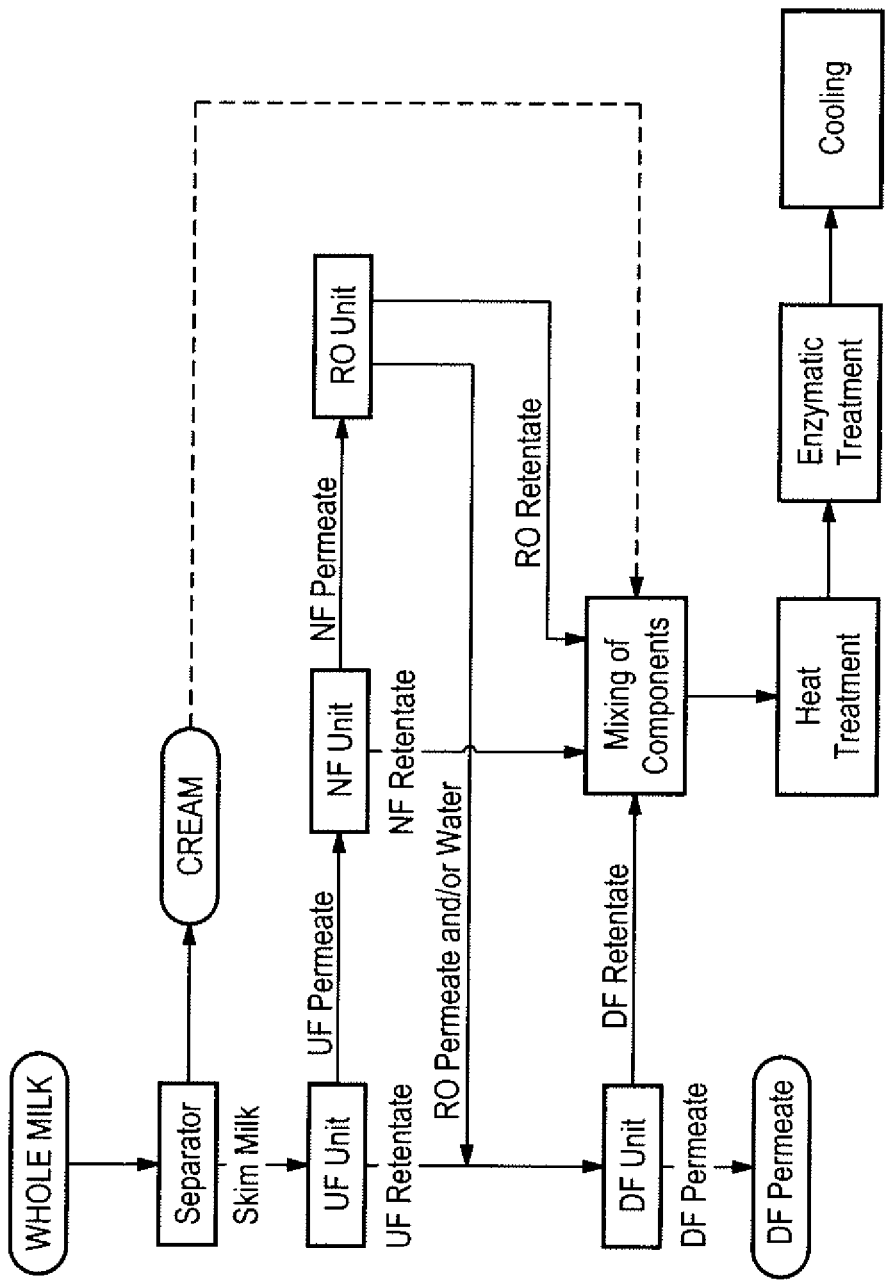
FIG. 3 illustrates a third method of separating milk components.

An embodiment of the invention also provides a dairy product comprising 6% protein and 1.5 to 1.8% lactose wherein the lactose content is reduced by membrane filtration technology (FIGS. 1-3). The dairy product is inoculated with yogurt bacteria that convert any remaining lactose to lactic acid by bacterial fermentation thus resulting in a sugar-free yogurt.

Processes according to the invention are also suitable for use in a wide variety of food products, such as other fermented milk products, fermented soy, rice and nut milk products, beverages and whipped toppings.

Other milks can also be used in substitution for bovine milk whether in whole or in part, e.g., camel, goat, sheep, equine milk or mixtures thereof. The base mix can also comprise a vegetable milk such as soy milk.

In certain embodiments of the invention, the bacteria from the fermented dairy base mix can be optionally removed by ultrafiltration or microfiltration for future use and the bacteria-free fermented dairy base is used for making yoghurt drinks.

The dairy product can additionally include flavors. Illustrative flavors include vanilla, amaretto, cheesecake, white chocolate, Cafe Au Lait, caramel apple, banana cream, lemon, lime, various fruit and berry flavors, and mixtures thereof. Furthermore, these dairy products can contain flavors or fruits, can be frozen to provide a frozen composition or can be in the form of a drinkable fluid to provide a drinkable dairy composition.

The dairy product can additionally include a conventional fruit sauce or puree. If present, the fruit constituent can comprise about 5% to about 15% of the cultured dairy base mix. The method can thus comprise the optional additional step of adding a fruit sauce or puree 40.

In the manufacture of Swiss-style yogurt, a fruit sauce or puree is blended substantially uniformly throughout the cultured dairy base mix after fermentation is complete but prior to packaging.

In the manufacture of "sundae" style yogurt, fruit sauce or puree is deposited at the bottom of the consumer container, and the container is then filled with the cultured dairy base mix. To prepare a sundae style yogurt product employing a stirred style yogurt, the cultured dairy base mix is prepared with added thickeners and/or stabilizer(s) to provide upon resting a yogurt texture that mimics a "set" style yogurt. In this variation, the fruit sauce or puree is added directly to the container, typically to the bottom, prior to filling with the cultured dairy base mix.

The fruit sauce or puree used in the invention may be any of a variety of conventional fruit flavorings commonly used in yogurt products. Typical flavorings include cherry, kiwi, key lime, strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer(s), natural and/or artificial flavors, colorings, water and citric acid or other suitable acid to control the pH.

The products can additionally include a variety of other ingredients to increase their nutritional, organoleptic or other consumer appeal, e.g., fruit pieces, nuts, partially puffed cereals, etc.

The invention will assist in establishing a centralized fermentation plant in multi-location factories, which will reduce the technical expertise requirement at all facilities for fermentation, culture propagation and storage of cultures.

While the invention has been described in connection with what is presently considered to be the most practical and exemplary embodiments, it is to be understood that the invention is not to be limited to the disclosed embodiments, but on the contrary, is intended to cover various modifications and equivalent arrangements included within the spirit and scope of the appended claims.

Throughout the specification and claims, percentages are by weight and temperatures in degrees Celsius unless otherwise indicated.

What is claimed is:

1. A method for making a dairy composition comprising the steps of:
    subjecting milk to an ultrafiltration step to produce an ultrafiltration permeate fraction and a ultrafiltration retentate fraction;
    subjecting the ultrafiltration permeate fraction to a nanofiltration step to produce a nanofiltration permeate fraction and a nanofiltration retentate fraction;
    subjecting the nanofiltration permeate to a reverse osmosis step to produce a reverse osmosis permeate fraction and a reverse osmosis retentate fraction;
    combining the ultrafiltration retentate fraction with water and the reverse osmosis permeate fraction to form a first mixture;
    subjecting the first mixture to a diafiltration step to produce a diafiltration permeate fraction and a diafiltration retentate fraction;
    mixing the nanofiltration retentate fraction with the diafiltration retentate fraction, cream and the reverse osmosis retentate fraction to form a second mixture; and
    incubating the second mixture with lactic-acid generating bacteria to convert lactose within the second mixture to lactic acid to form a sugar-free dairy composition.

2. The method of claim 1, wherein the second mixture has a pH of less than 5.0.

3. The method of claim 1, wherein the second mixture is incubated with the lactic-acid generating bacteria for 4-6 hours at 42° C.

4. The method of claim 1, wherein the sugar-free dairy composition is concentrated by reverse osmosis.

5. The method of claim 1, wherein the sugar-free dairy composition is concentrated by ultrafiltration.

* * * * *